United States Patent [19]

Helms et al.

[11] Patent Number: 5,100,523
[45] Date of Patent: Mar. 31, 1992

[54] USE OF AMORPHOUS CARBON TO PROMOTE ADHESION BETWEEN ELECTROACTIVE POLYMER FILMS AND CONDUCTIVE SUBSTRATES

[75] Inventors: Jeffrey H. Helms, Ann Arbor, Mich.; H. Kiel Plummer, Jr., Dearborn, both of Ohio; Michael A. Tamor, Toledo, Ohio

[73] Assignee: Ford Motor Company, Dearborn, Mich.

[21] Appl. No.: 628,034

[22] Filed: Dec. 17, 1990

[51] Int. Cl.$^5$ .............. C25B 11/00; C25C 7/02; H01M 4/60; G02F 1/01
[52] U.S. Cl. .............. 204/290 R; 204/59 R; 425/213; 359/265; 359/273; 359/274
[58] Field of Search .............. 204/59 R, 290 R; 429/213; 359/265, 273, 274

[56] References Cited

U.S. PATENT DOCUMENTS

| | | |
|---|---|---|
| 4,153,529 | 5/1979 | Little et al. |
| 4,586,792 | 5/1986 | Yang et al. ............ 350/357 |
| 4,613,211 | 9/1986 | Papir et al. ............ 350/357 |
| 4,719,152 | 1/1968 | Ohta et al. ............ 428/432 |

OTHER PUBLICATIONS

Miasic, J. J. et al., "Electronically Conducting Polymer Gas Sensors", Conducting Polymers, D. Reidel Publishing Co., 1987, pp. 189–193.
Rubinstein et al., "Morphology Control in Electrochemically Grown Conducting Polymer Films 1. Precoating the Metal Substrate with an Organic Monolayer", J. Am. Chem. Soc., 1990, 112, pp. 6135–6136.

*Primary Examiner*—John Niebling
*Assistant Examiner*—Steven P. Marquis
*Attorney, Agent, or Firm*—Charles H. Ellerbrock; Roger L. May

[57] ABSTRACT

An interposed layer of amorphous carbon promotes the adhesion between conductive substrates and electrochemically deposited polymers. Such a carbon layer may be deposited directly onto the conductive substrate by conventional methods such as, for example, chemical vapor deposition. The subsequently applied electrochemically deposited polymer adheres more tenaciously to the amorphous carbon coating than if it had been electrodeposited directly onto the conductive substrate.

15 Claims, No Drawings

USE OF AMORPHOUS CARBON TO PROMOTE ADHESION BETWEEN ELECTROACTIVE POLYMER FILMS AND CONDUCTIVE SUBSTRATES

FIELD OF THE INVENTION

This invention is directed to the use of a layer of amorphous carbon to promote adhesion between electroactive polymer films and conductive substrates.

BACKGROUND OF THE INVENTION

Metal-like properties, such as electrical conductivity, were first discovered in molecularly doped polyacetylene in 1977 (see Shirakawa et al., J. Chem. Soc. Chem. Commun., 1977, p. 578). Since that discovery, the characteristics of several electroactive polymers have been studied extensively.

The electrochemical polymerization of a monomer suitable for preparing an electroactive polymer was initially achieved utilizing pyrrole to form polypyrrole. It was determined that polypyrrole had an electrical conductivity of 100 $Scm^{-1}$ and could undergo reversible oxidation and reduction by applying an electrical potential from about 0.8 volts to about $-0.6$ volts with respect to a saturated calomel electrode. Accompanying the oxidation/reduction process was an associated color change from blue-black to pale yellow, respectively.

The formation of electroactive polymer films on conductive substrates by electrochemical techniques has been found to produce polymer coated electrodes suitable for a variety of purposes arising either from the reversible oxidation and reduction of the polymer films or from the high electrical conductivity of the polymer films. As examples, electroactive polymer coated conductive substrates can be used to prepare electrochromic devices, "smart" windows, optical switches for information processing and charge coupled devices, electromagnetic interference devices, semipermeable membranes, catalytic electrodes, gas sensors, photovoltaic components, solid batteries, diodes, fast response non-linear optical materials, and electrostatic dissipation devices.

A severe limitation on the use of electroactive polymer coated conductive substrates for the purposes listed hereinabove, however, is the fact that electrochemically deposited conductive polymers are easily removed from conductive substrates by contact with a solvent or mechanically by moderate abrasion. Thus, the limited durability of electroactive polymer coated conductive substrates precludes their widespread use. Furthermore, the electrochemically deposited films generally have a non-uniform topography, limited solubility in common solvents, and widely ranging electrical conductivities from about $10^{-2}$ $Scm^{-1}$ to about $10^2$ $Scm^{-1}$.

Scanning electron microscopy data as well as optical micrographs show the presence of filamentary structures in electroactive polymer films, such as polypyrrole, which are electrochemically deposited directly onto conductive substrates, such as fluorine-doped or indium-doped tin oxide coated glass. It is believed that these structures represent areas of high density polymer growth resulting from an insufficient number of equivalent initiation sites, or the presence of preferred sites, on the surfaces of the conductive substrates. Weak adhesion then results from the small number of equivalent polymer nucleation sites, the absence of chemical bonds and/or weak van der Waals interactions, and stress imposed upon the nucleation sites by the film growth between filaments. Thus, electrochemically synthesized electroactive polymer films deposited directly onto conductive substrates are easily disengaged therefrom, and exhibit a considerable degree of surface and compositional non-uniformity.

Miasik et al., "Electronically Conducting Polymer Gas Sensors," Conducting Polymers, D. Reidel Publishing Co., 1987, p. 189 discloses a method for depositing a film of polypyrrole directly onto a gold film by the electropolymerization of pyrrole from an aqueous solution, to produce an ambient temperature detection device for several industrial gases. The resistance of the polypyrrole film so produced increases in the presence of ammonia and decreases in the presence of hydrogen sulfide. The durability of such a device, however, is limited due in part to the poor adhesion between the polypyrrole film and the gold substrate.

In Rubinstein et al., "Morphology Control In Electrochemically Grown Conducting Polymer Films. 1. Precoating The Metal Substrate With An Organic Monolayer," J. Am. Chem. Soc., 1990, 112, p. 6135, a monolayer of p-aminothiophenol was deposited onto the surface of a gold substrate to improve the adhesion thereto of an electrochemically grown polyaniline electroactive polymer film. The article states that the adhesion-promoting monolayer significantly increases the density of the electrochemically grown polymer film, and results in a radiation absorption coefficient at 6,000 Angstroms about eight time higher than the average adsorption coefficient for the same film grown on "bare" gold. The substantial increase in the electroactive polymer film density is attributed to the adhesion-promoting monolayer which facilitates and regulates the bonding between the modified gold substrate surface and the growing phase of polyaniline. It is stated that the beneficial effect obtained concerning film morphology is apparently caused by a more uniform and efficient nucleation-and-growth process on the treated surface, resulting in a film with significantly improved space filling. Thus, it is recognized that an adhesion-promoting layer between an electroactive polymer film and a conductive substrate provides the dual benefit of greater durability and increased polymer density. The deposition of a monolayer of p-aminothiophenol, however, is difficult to achieve and accurately control.

U.S Pat. No. 4,719,152 to Ohta et al. discloses an adhesion-promoting metal or metal oxide layer which is deposited onto a conductive layer such as, for example, indium-tin oxide. Thereafter, a pre-formed layer of electroluminescent material is mechanically jointed to the adhesion-promoting layer, to form a multi-layered structure which resists delamination of the conductive layer away from the electroluminescent layer. The electroluminescent layer is not, however, an electroactive polymer, but a zinc sulfide- and manganese-containing cellulose-type resin. Furthermore, the electroluminescent layer is not electrochemically grown on the exposed surface of the adhesion-promoting layer but is mechanically affixed thereto.

U.S. Pat. No. 4,153,529 to Little et al. discloses the use of a surface-modified amorphous carbon layer on an indium-tin oxide coated glass substrate, to achieve the uniform alignment of molecules in a liquid crystal material spread over the amorphous carbon layer. The amorphous carbon is scrubbed with neutralized ions to produce parallel microscopically fine grooves on its surface, which grooves induce parallel alignment of the liquid crystal molecules. Liquid crystal material, however, is quite different from the electroactive polymers contemplated by the present invention. Moreover, the liquid crystal material is merely spread over the amorphous carbon layer as opposed to being electrochemically deposited thereon.

It would be desirable to prepare by a simple process an electroactive polymer coated conductive substrate, having improved adhesion between the film and substrate and therefore greater durability, and having improved film properties such as greater density and uniformity and therefore greater conductivity.

SUMMARY OF THE INVENTION

Accordant with the present invention, an electroactive polymer coated conductive substrate, having improved adhesion between the polymer and the substrate, has surprisingly been discovered. The electroactive laminate comprises a conductive substrate, a layer of amorphous carbon adhered to the conductive substrate, and an electroactive polymer film adhered to the layer of amorphous carbon opposite the conductive substrate.

Particularly useful electroactive laminates are prepared utilizing a fluorine-doped tin oxide coated glass support as the conductive substrate. The amorphous carbon may be applied by any process which will result in an adherent, electrically conductive layer. Suitable electroactive polymers are electrochemically deposited onto the amorphous carbon layer by polymerizing heterocyclic compounds such as pyrrole.

The electroactive laminates of the present invention are useful for preparing several commercial products such as, for example, electrochemical cell electrodes, electrochromic devices, and the like.

DETAILED DESCRIPTION OF THE PREFERRED EMBODIMENT

This invention is directed to the use of a layer of amorphous carbon to promote adhesion between electroactive polymer films and conductive substrates. By the term "electroactive polymer" is meant a material electrochemically or otherwise polymerized onto a surface from a monomer solution, which polymer exhibits variable physical and/or chemical properties resulting from a chemical reaction within the polymer, upon the application of an external electrical potential. Such a definition excludes materials such as, for example, liquid crystal materials which contain chemically inactive molecules. Electroactive polymer films electrochemically deposited onto amorphous carbon layers are not only more durable, but additionally have greater density and uniformity. Thus the invention contemplates an electroactive laminate comprising consecutively a conductive substrate, a layer of amorphous carbon, and an electroactive polymer.

The conductive substrates according to the present invention may be virtually any materials which are known to be useful for conducting electrical energy and upon which consecutive layers of amorphous carbon and an electroactive polymer may be formed. Clearly, metals including, but not necessarily limited to, silver, gold, platnium, copper, aluminum, nickel, chromium, iron, tin, silica, titanium, magnesium, tungsten, and zinc, as well as alloys and multiple layers thereof may be used as conductive substrates. Furthermore, such metals may be coated onto a support material at a thicknesses from about 20 Angstroms to several thousand Angstroms, to form a conductive substrate according to the present invention. Suitable support materials include, but are not necessarily limited to glass, quartz, and plastics such as polycarbonates, polyacrylics, polyesters, polystyrenics, celluosics, and the like, as well as copolymers and laminates thereof.

Alternatively, the conductive substrates may comprise a support material as listed hereinabove having a layer of a metal oxide on a surface thereof. Suitable metal oxides, which conveniently may be deposited in thicknesses from about 100 Angstroms to several thousand Angstroms, include but are not necessarily limited to tin oxide, indium oxide, cadmium oxide, antimony oxide, zinc oxide, and the like, as well as mixtures and multiple layers thereof. A preferred conductive substrate comprises a glass support having a layer of fluorine-doped tin oxide from about 100 Angstroms to about 10,000 Angstroms thick thereon.

For the preparation of certain useful devices employing the electroactive laminates of the present invention such as, for example, an electrochromic device, it is necessary that the conductive substrate be transparent. Such a transparent conductive substrate may comprise, for example, an electrically conductive metal or metal oxide layer on glass. The thickness of the metal or metal oxide layer must, of course, not be so great as to block the passage of visible light therethrough. Generally, the operable thickness range for transparent metal or metal oxide layers is from about 100 Angstroms to about 5,000 Angstroms, accompanied by a corresponding variance in transmissivity for the conductive substrate.

A preferred conductive substrate, comprising metal or metal oxide coated glass, may be prepared by any conventional coating process generally known in the art such as, for example, vacuum evaporation, chemical vapor deposition, sol-gel deposition, spray pyrolysis, ion plating, reactive sputtering, etc. Methods for depositing metal and metal oxide coatings on glass are more fully set forth in Kirk-Othermer, "Concise Encyclopedia of Chemical Technology," John Wiley & Sons, Inc., 1985, pp. 477-478, which is incorporated herein by reference thereto.

Amorphous carbon is the adhesion-promoting layer which is deposited directly onto the conductive substrate. By amorphous carbon is meant imperfectly ordered molecular structures having relatively high surface areas. Generally, planes of the carbon atoms are layered, irregular, and oriented relative to the surface of the conductive substrate. Cross-linking between the planes accounts for greater hardness and mechanical strength compared to graphitic structures which lack cross-linking of planes.

Amorphous carbon may be deposited onto a surface of the conductive substrate by any conventional method such as, for example, vacuum evaporation, plasma enhanced chemical vapor deposition, reactive sputtering, glow discharge, etc. The amorphous carbon is deposited in a thickness which promotes the adhesion of a subsequently applied electroactive polymer film to the conductive substrate. Generally, a layer of amorphous carbon from about 40 Angstroms to about 1000 Angstroms is effective to promote adhesion. Preferably, the amorphous carbon layer is from about 40 Angstroms to about 250 Angstroms thick, depending upon the particular application. For optical clarity, the amorphous carbon layer must be of the preferred thickness from about 40 Angstroms to about 250 Angstroms.

The electroactive polymers of the present invention include any of the polymers which may be electrochemically grown or deposited onto a substrate. Such electroactive polymers include, but are not necessarily limited to, polyheterocycles prepared from pyrrole, thiophene, aniline, carbazole, azulene, furan, and the like, as well as derivatives and mixtures thereof. Notable monomers from which the electroactive polymers of the present invention may be prepared include pyrrole, N-methylpyrrole, thiophene, and 3-methylthiophene.

Polymerization of the monomer is carried out by a technique well known in the electrochemical arts utilizing an electrolysis cell containing an electrolyte medium comprising the monomer, an organic solvent, and an electrolyte. Suitable organic solvents include, but are not necessarily limited to, acetonitrile, propylene carbonate, tetrahydrofuran, propionitrile, butyronitrile, phenylacetonitrile, dimethylformaide, dimethoxyethane, dimethylsulfoxide, pyridine, methylene chloride, and the like, as well as mixtures and aqueous solutions thereof. A preferred solvent is acetonitrile. Useful electrolytes include, but are not necessarily limited to, anion-cation pairs, wherein the cation is selected from cations such as $Li^+$, $Na^+$, $K^+$, $Cs^+$, $Mg^{++}$, $(CH_3)_4N^+$, $(C_2H_5)_4N^+$, $(C_3H_7)_4N^+$, $(C_4H_9)_4N^+$, etc , and the anion is selected from anions such as $BF_4^-$, $ClO_4^-$, $I^-$, $Br^-$, $NO_3^-$, $PF_6^-$, $AsF_6^-$, $CF_3SO_2^-$ and the like. Preferred electrolytes are lithium tetrafluoroborate and lithium perchlorate, as well as mixtures thereof. The monomer concentration is generally from about 0.005 to about 0.5 moles per liter while the electrolyte concentration is from about 0.01 to about 1.0 mole per liter. The electroactive polymer is deposited on the amorphous carbon coated conductive substrate at a rate which depends on the monomer concentration, the potential of the conductive substrate, and the current between the conductive substrate and the electrolysis cell cathode. The electroactive polymer films according to the present invention may be deposited in any thickness, depending upon their intended use.

The adhesion of electroactive polymer films to conductive substrates having a layer of amorphous carbon thereon is substantially greater than the adhesion of the identical polymer films to uncoated conductive substrates. While not wishing to be bound by any particular theory concerning the mechanism by which the amorphous carbon layer promotes adhesion between the electroactive polymer films and the conductive substrates, it appears either that covalent bonding occurs between the electroactive polymer and the amorphous carbon or that the number of electroactive polymer polymerization sites increases, or both. Conversely, the number of polymerization initiation sites available on a bare conductive substrate is small, resulting in filamentary electroactive polymer growth.

Furthermore, it is possible that charge injection or ejection over the surface of a bare conductive substrate during the electrochemical polymerization of heterocyclic monomers occurs at grain interfaces leading to dense growth from such regions and therefore filamentary polymer structures. If this is true, then the addition of an amorphous carbon layer may act as a charge diffusor, meaning that reactive areas on the surface of the otherwise bare conductive substrate are not directly accessible from the electrolyte solution due to the intervening amorphous carbon coating.

Use of the amorphous carbon layer according to the present invention additionally improves the surface and compositional uniformity of the subsequently electrochemically deposited electroactive polymers. It has been determined that the amorphous carbon layer results in a decrease in the electrochemical initiation potential and in the potential required during the early stages of polymerization. This fact can be interpreted as a reduction in the applied potential needed to produce the desired current density due to a greater number of polymerization initiation and growth sites. At higher current densities, the effect is less noticeable due to the diffusion limited processes which must occur during the electrochemical polymerization process. Higher current densities correspond to faster rates of electropolymerization and, therefore, such effects become even more important.

Even though a layer of amorphous carbon increases the effective surface resistance of the conductive substrate, it also results in the creation of an extremely uniform electroactive polymer film. Such films are reflective (having a greater density than films electropolymerized onto bare conductive substrates) and often exhibit a metallic appearance. For example, electroactive polymer films of polypyrrole electrodeposited onto amorphous carbon coated conductive substrates appear golden-metallic, in contrast to the same electroactive polymers electrodeposited onto uncoated conductive substrates which appear as non-reflective black or very dark blue-black in the electrochemically generated oxidized form. When reduced, these films appear pale yellow on either substrate.

The electroactive laminate of the present invention may be used as an element in an electrochemical cell, to pass electrical current between the conductive substrate and the cell electrolyte solution, wherein the conductive substrate and electrolyte are as defined hereinabove. The electroactive laminate may be used as a counterelectrode or may form the electrochromic element of an electrochromic device. In a preferred embodiment, the electroactive polymer is an electrochromic polymer, in which a physical/chemical change produced in response to electron transfer caused by an externally applied electrical potential results in a change in the reflectivity or transmissivity of the film with respect to electromagnetic radiation. Such electroactive electrochromic polymers may likewise be prepared by the electrochemical deposition of polymers from heterocycles selected from the group consisting of pyrrole, thiophene, carbazole, azulene, furan, and derivatives and mixtures thereof. As an example, a polypyrrole electroactive polymer film will change form a black or dark blue color in its oxidized state to a pale yellow color in its reduced state. Such an electrochemical cell then may be used as an electrochromic display device.

An electrochemical cell broadly comprises an electroactive laminate, a counterelectrode which may also comprise an electroactive laminate, and an electrolyte in electrical communication therebetween. Generally, where the electrochemical cell is intended to act as an electrochromic display device, either the electroactive laminate or counterelectrode or both must be transparent. During operation, means for supplying a voltage, such as a battery and associated electrical leads, is utilized to apply a voltage between the electroactive laminate and the counterelectrode. The electroactive polymer thereby may be switched from its oxidized to its reduced state by applying voltages in the range from about 1.5 volts to about −1.5 volts across the cell. Electrochromic polymers are typically operated using low voltages, and can provide suitable visual contrasts with an electron transfer of only several millicoulombs of electrical charge per square centimeter of display area. Switching is easily achieved by polarity changes or voltage sweeps.

The chemical reactions described hereinabove are generally disclosed in terms of their broadest application to the practice of the present invention. Occasionally, the reactions as described may not be applicable to each compound included within the disclosed scope. Those compounds for which this occurs will be readily recognized by those ordinarily skilled in the art. In all such cases, either the reactions may be successfully performed by conventional modifications known to those ordinarily skilled in the art, e.g., by changing to alternative conventional chemical reagents or heterocyclic derivatives, or by routine modifications of reaction conditions, or other reactions which are otherwise conventional will be applicable to the practice of this invention.

EXAMPLES

Amorphous carbon is deposited onto a fluorine-doped tin oxide coated glass substrate, such as a Low-E glazing product manufactured by Ford Motor Company, using an Edwards Vacuum Coating Unit, Model E306A operated at a pressure of about $10^{-4}$ Pa. Spectrographically pure ⅛ inch diameter carbon rods are evaporated with a current of about 54 to 63 ampers at about 10 volts, to produce an amorphous carbon layer thickness from about 50 Angstroms to about 100 Angstroms. The distance between the arc source and the stationary conductive substrate is about 13.5 cm during the vacuum evaporation process.

Electropolymerization is performed in a single compartment electrolysis cell, utilizing a monomer, an organic solvent, and an electrolyte. Either pyrrole or N-methylpyrrole is used at a concentration of either about 0.1 moles per liter or about 0.2 moles per liter; acetonitrile is used as the organic solvent; and either lithium tetrafluoroborate or lithium perchlorate is used as the electrolyte at a concentration of about 0.1 moles per liter. Current densities are held constant between about 0.08 mA/cm$^2$ and about 0.3 mA/cm$^2$. All solutions are first deaerated by bubbling argon through the cell for about one half hour prior to use. The counterelectrode is gold mesh. Cell control is maintained by an EG&G Princeton Applied Research Model 273 potentiostat/galvanostat. Variable temperature control between about −20° C. and about 30° C. is maintained through the use of a Thermoelectrics Unlimited Model SK-12 Stir-Kool unit. Thus, electroactive polymer films having thicknesses from bout 500 Angstroms to about 2,000 Angstroms are electrochemically deposited onto the amorphous carbon layers. The morphology of the electroactive polymer films is studied utilizing a JEOL JSM840A scanning electron microscope operated in secondary electron, backscattering topography, and Z-contrast imaging modes. Filamentary electroactive polymer structures are absent, in contrast to the filamentary structures observed for electroactive polymers electrochemically deposited onto bare fluorine-doped tin oxide coated glass supports. Backscatter topography reveals electroactive polymer films having a high degree of surface uniformity and smoothness. Z-contrast imaging indicates compositionally homogeneous electroactive polymer films.

Adhesion testing is performed by covering the exposed surface of the electroactive polymer film with Scotch brand adhesive tape, and varying the speed at which the tape is removed. The resulting surface is analyzed with respect to the amount of electroactive polymer film missing from the electroactive laminate following the tape removal. It is observed that tape applied to the surface of the electroactive polymer and ripped off results in an undisturbed film. Thinner amorphous carbon layers appear to provide greater adhesion of the electroactive polymer films. This is in contrast to electroactive polymer films which are electrochemically deposited onto bare fluorine-doped tin oxide coated glass supports, which are easily removed by mild abrasion.

Switching rates are determined by applying a 1.5 volt electrical potential across a cell comprising the electroactive laminate, a gold mesh counterelectrode, and about a 0.1 mole per liter solution of lithium perchlorate in acetonitrile. It is observed that the electroactive polymer films appear to switch between the oxidized and reduced states instantaneously. This is in contrast to electroactive polymer films electrochemically deposited onto bare fluorine-doped tin oxide coated glass supports, which require between about 1 and about 3 seconds for switching.

Electrical resistivity measurements are made by the van der Pauw technique (see van der Pauw, L., Philips. Res. Rep., 1958, 12, 1). The electrical current is controlled between about 1 microamp and about 100 milliamps utilizing a Keithley Instruments, Inc. Model 224/2234 programmable current source. Voltage drops are measured utilizing a Keithley Instruments, Inc. Model 199/1992 digital multimeter with an eight-channel scanner. The electroactive polymer films display a wide range of conductivities, depending upon their thicknesses. Electroactive polymer films having thicknesses of about 1 micron have a conductivity from about 20 Scm$^{-1}$ to about 80 Scm$^{-1}$, while films having a thickness of about 0.15 micron have been observed to exhibit a conductivity as high as 4,500 Scm$^{-1}$. This is in contrast to electroactive polymer films electrochemically deposited onto bare fluorine-doped tin oxide coated glass supports having conductivities equal to only about 40% of the conductivities of their coated substrate counterparts.

These examples may be repeated with similar success by substituting the generically or specifically described reactants and/or reaction conditions recited herein for those actually used in the preceding examples.

From the foregoing description, one skilled in the art can easily ascertain the essential characteristics of this invention, and without departing from its spirit and scope, can make various changes and modifications in the invention to adapt it to various usages and conditions.

What is claimed is:

1. An electroactive laminate, comprising:
   A) a conductive substrate;
   B) a layer of amorphous carbon adhered to the conductive substrate; and
   C) an electroactive polymer film adhered to the layer of amorphous carbon opposite the conductive substrate.

2. The electroactive laminate according to, claim 1, wherein the conductive substrate comprises a glass support having at least one layer of a metal oxide from about 100 Angstroms to about 10,000 Angstroms thick thereon.

3. The electroactive laminate according to claim 2, wherein the metal oxide comprises fluorine-doped tin oxide.

4. The electroactive laminate according to claim 1, wherein the layer of amorphous carbon is from about 40 Angstroms to about 1000 Angstroms thick.

5. The electroactive laminate according to claim 1, wherein the electroactive polymer is prepared from heterocycles selected from the group consisting of pyrrole, thiophene, aniline, carbazole, azulene, furan, and derivatives and mixtures thereof.

6. The electroactive laminate according to claim 5, wherein the electroactive polymer is prepared from heterocycles selected from the group consisting of pyrrole, N-methylpyrrole, thiophene, 3-methylthiophene, and mixtures thereof.

7. In an electrochemical cell, comprising an electrode, a counterelectrode, and an electrolyte in electrical communication therebetween, the improvement wherein the electrode is the electroactive laminate of claim 1.

8. An electrochromic display device, comprising:
   A) an electroactive laminate, comprising:
      i) a conductive substrate;
      ii) a layer of amorphous carbon adhered to the conductive substrate; and
      iii) an electroactive electrochromic polymer film adhered to the layer of amorphous carbon opposite the conductive substrate;
   B) a counterelectrode;
   C) an electrolyte medium in electrical communication with the electroactive laminate and the counterelectrode; and
   D) means for supplying a polarity reversible voltage across the electroactive laminate and the counterelectrode.

9. The electrochromic display device according to claim 8, wherein the conductive substrate comprises a glass support having at least one layer of a metal oxide from about 100 Angstroms to about 5,000 Angstroms thick thereon.

10. The electrochromic display device according to claim 9, wherein the metal oxide comprises fluorine-doped tin oxide.

11. The electrochromic display device according to claim 8, wherein the layer of amorphous carbon is from about 40 Angstroms to about 250 Angstroms thick.

12. The electrochromic display device according to claim 8, wherein the electroactive polymer is prepared from heterocycles selected from the group consisting of pyrrole, thiophene, aniline, carbazole, azulene, furan, and derivatives and mixtures thereof.

13. The electrochromic display device according to claim 12, wherein the electroactive polymer is prepared from heterocycles selected from the group consisting of pyrrole, N-methylpyrrole, thiophene, 3-methylthiophene, and mixtures thereof.

14. The electrochromic display device according to claim 8, wherein the eletrolyte medium contains electrolyte selected from the group consisting of lithium tetrafluoroborate and lithium perchlorate, and mixtures 15. An electrochromic display device, comprising:
   A) an electroactive laminate, comprising:
      i) a conductive substrate, including a glass support having at least one layer of fluorine-doped tin oxide from about 100 Angstroms to about 5,000 Angstroms thick thereon;
      ii) a layer of amorphous carbon, from about 40 Angstroms to about 250 Angstroms thick, adhered to the conductive substrate; and
      iii) an electroactive electrochromic polymer film, prepared from heterocycles selected from the group consisting of pyrrole, thiophene, aniline, carbazole, azulene, furan, and derivatives and mixtures thereof, adhered to the layer of amorphous carbon opposite the conductive substrate;
   B) a counterelectrode;
   C) an electrolyte medium, containing electrolyte selected from the group consisting of lithium tetrafluoroborate and lithium perchlorate and mixtures thereof, in electrical communication with the electroactive laminate and the counterelectrode; and
   D) means for applying a voltage across the electroactive laminate and the counterelectrode.

* * * * *